United States Patent
Kahn et al.

(10) Patent No.: US 9,206,910 B2
(45) Date of Patent: Dec. 8, 2015

(54) GATE VALVE HAVING LOW-FRICTION COATING OVER SUBSTRATE AND METHOD FOR MAKING SAME

(75) Inventors: Jon Bonner Kahn, Spring, TX (US); Fei Tang, Katy, TX (US)

(73) Assignee: Vetco Gray Inc., Houston, TX (US)

( * ) Notice: Subject to any disclaimer, the term of this patent is extended or adjusted under 35 U.S.C. 154(b) by 1112 days.

(21) Appl. No.: 13/085,315

(22) Filed: Apr. 12, 2011

(65) Prior Publication Data

US 2012/0261603 A1  Oct. 18, 2012

(51) Int. Cl.
*F16K 25/00* (2006.01)
*F16K 3/02* (2006.01)
*E21B 34/02* (2006.01)

(52) U.S. Cl.
CPC ............ *F16K 3/0236* (2013.01); *E21B 34/02* (2013.01); *F16K 25/005* (2013.01); *Y10T 29/49425* (2015.01)

(58) Field of Classification Search
CPC ...... F16K 3/0263; F16K 25/005; E21B 34/02
USPC .................................. 137/375; 251/326–329
See application file for complete search history.

(56) References Cited

U.S. PATENT DOCUMENTS

| | | | | |
|---|---|---|---|---|
| 3,614,061 | A * | 10/1971 | Fitzpatrick | 251/327 |
| 5,803,431 | A * | 9/1998 | Hoang et al. | 251/327 |
| 6,896,978 | B2 * | 5/2005 | Kiyotoki et al. | 428/668 |
| 6,935,618 | B2 * | 8/2005 | Welty et al. | 251/368 |
| 7,255,328 | B2 | 8/2007 | Hunter | |
| 8,261,841 | B2 * | 9/2012 | Bailey et al. | 166/380 |
| 2006/0043327 | A1 | 3/2006 | Hunter | |
| 2007/0163655 | A1 | 7/2007 | Hunter | |

OTHER PUBLICATIONS

GB Search Report and Opinion dated Jul. 23, 2012 from corresponding Application No. GB1205964.8.

* cited by examiner

*Primary Examiner* — Eric Keasel
(74) *Attorney, Agent, or Firm* — Bracewell & Giuliani LLP (57) ABSTRACT

A gate valve has a body, the body having a cavity and a flow passage intersecting the cavity. A seat fabricated from a ceramic and/or hardfacing alloy matrix composite substrate is mounted to the body at the intersection of the flow passage and the cavity. A gate fabricated from a ceramic and/or hardfacing alloy matrix composite substrate is installed at the cavity and has an engaging face that slidingly engages the seat while the gate is being moved between open and closed positions. The engaging faces of the gate and seats are coated with a low-friction material to facilitate sliding. The ceramic and/or hardfacing alloy matrix composite substrate construction of the gate and seats with low friction engaging surfaces enhances the gate valve's bearing stress capacity.

12 Claims, 6 Drawing Sheets

GATE VALVE HAVING LOW-FRICTION COATING OVER SUBSTRATE AND METHOD FOR MAKING SAME

FIELD OF THE INVENTION

This invention relates in general to valves, and in particular to a gate and/or a seat seal in a valve body with a substrate comprising a ceramic and/or hardfacing alloy matrix composite which allows for increased bearing stress capacity.

BACKGROUND OF THE INVENTION

Gate valves are typically used when a straight-line flow of fluid and minimum flow restriction are required. Typically, the gate has body with a cavity and a flow passage extending through the body and intersecting the cavity to allow flow through the valve. When the valve is wide open, the gate is drawn into an end of the valve cavity away from the flow passage. The flow passage is typically the same size as the pipe in which the valve is installed.

A typical gate valve used in connection with oil and gas production has a flow passage that intersects a central cavity in the valve. Seats are placed in counterbores formed in the flow passage at the intersection of the flow passage with the cavity. An obstruction or gate is moved past the seats between open and closed positions to seal the cavity from the passage.

The seats generally have seals which seal the seat to the counterbore of the flow passage. These seals prevent the entry of fluid from the central cavity or chamber of the body to the downstream flow passage. When the gate is opened, the seals perform no function. For gate valves designed with unidirectional sealing when the gate is closed, fluid will flow past the upstream seat into the chamber or cavity of the body. The fluid pressure in the chamber is sealed by the seal of the downstream seat formed between the gate and the seat. In addition, a sand screen may also be positioned in the seats to protect the valve from sand intrusion. For gate valves designed with bidirectional sealing when the gate is closed, fluid is maintained on one side of the gate and not allowed to flow into the chamber or cavity of the body.

When gate valves are subjected to high pressure environments, the bearing stress between the seat and the gate increases and thus gate valves must be able to tolerate the increased bearing stress. This is especially the case on the downstream side of the gate as the gate is forced onto the seat. This can often result in local deformation of the gate where it contacts the seat, making it more difficult or impossible to actuate the gate between open and closed positions. To counter this problem, the size of the valve, the actuators, and the tree may be increased, resulting in additional weight and expense.

One approach used to address this issue has been to coat the (metal) gate and seat with a thin coating composed of Tungsten Carbide particles with CoCr metal binder (WCCoCr coating) due to its hardness and low friction. Diamond-like Carbon (DLC) coatings have also been used on top of the WCCoCr coatings to lower the friction further. However, there is a limit to the bearing stress beyond which these coatings tend to locally deform or gall, creating stresses in the coatings and thus limiting bearing stress. Eventually leakage and difficulty in operating the gate valve may result. Another approach to control this bearing stress is to increase the surface area of the seat by increasing its diameter. However this also has the unintended effect of increasing the force applied due to the increased effective pressure-area. The return on controlling bearing stress with this method diminishes with higher pressure valves, resulting in even larger valves and the actuators needed to close and open them. Another approach has been to attempt solid ceramic or cemented carbide gates and seats to achieve a higher bearing stress capacity. The problem thus far is that the high temperatures required for sintering solid parts typically results in degraded carbide properties, which in turn result in a poor surface texture and high friction.

A need exists for a technique to increase bearing stress capacity in gate valves and minimize friction without an increase in the actuator size or production tree.

SUMMARY OF THE INVENTION

A gate valve having a substrate of a ceramic and metal matrix composite material with increased stiffness and hardness, relative to the current metals used in gates and seats, above which a low-friction coating is applied. An example of a ceramic and/or hardfacing alloy matrix composite substrate is Tungsten Carbide in a cobalt matrix. The greater stiffness and hardness of the ceramic and metal matrix composite material substrate supports the coatings and increases the net bearing stress capacity and thus the efficiency of the valve. In previous efforts, local deformations of the softer metal under a harder, thin layer of coating caused premature failure of the coating. With a substrate below the coating of greater hardness and stiffness than the underlying metal, this can be avoided. Using a substrate of greater stiffness and hardness, the bearing stress capacity of the same coating, which was previously applied directly to the metal, will therefore be increased. This combination of substrate and coating will allow the seat to have a smaller sealing diameter and the gate to be less wide due to the reduced requirement for bearing support area. As a result, the net force and friction between the seat and gate are lessened; reducing the force and energy requirement on the valve's hydraulic actuator. This can be achieved in three primary ways, with multiple combinations deriving from those three.

In a first embodiment of the invention, a gate valve has a body with a cavity and a flow passage intersecting the cavity. Seats are mounted in the body at the intersection of the flow passage and the cavity. A gate in the cavity has an engaging face that slidingly engages the face of each seat while being moved between open and closed positions. Both the seats and the gate are constructed from a ceramic and/or hardfacing alloy matrix composite substrate having a greater hardness and stiffness than the metal of the gate, such as Inconel. A low-friction coating may be applied to one or both of the substrates, the gate substrate and the seat substrate.

In a second embodiment of the invention, a gate valve has a body with a cavity and a flow passage intersecting the cavity. Metal seats are mounted in the body at the intersection of the flow passage and the cavity. A ceramic and/or hardfacing alloy matrix composite seat ring is mounted in each seat and has an engaging face which is coated with a low-friction material A gate in the cavity has an engaging face that slidingly engages the face of each seat while being moved between open and closed positions. The gate is composed of a metal base sandwiched between two ceramic and/or hardfacing alloy matrix composite plates, whose outer surfaces are coated with a low-friction material.

In a third embodiment of the invention, a gate valve has a body with a cavity and a flow passage intersecting the cavity. Metal seats are mounted in the body at the intersection of the flow passage and the cavity. A gate in the cavity has two engaging faces that slidingly engages the face of each seat while being moved between open and closed positions. A ceramic and metal matrix composite hardfacing of about ⅛ inch thickness or less is applied by a welding, powder metallurgy or thermal spray technique on the engaging surfaces of the gate and two seats. The gate is composed of a metal base sandwiched between two ceramic and/or hardfacing alloy matrix composite hardfacings, whose outer surfaces are coated with a low-friction material. The seat is composed of a metal base with the engaging surface coated with a ceramic and/or hardfacing alloy matrix composite hardfacing and then coated with a low-friction material. This hardfacing technique may be utilized in each of the embodiments presented as an alternative to using a ceramic and/or hardfacing alloy matrixsubstrate to provide a stiffer surface.

Any combination of the previously described seat and gate substrate configurations is also possible. For instance, one valve design may favor a hardfaced metal seat with a solid ceramic gate, while another valve may be better suited to use a metal seat/ceramic seat ring with a hardfaced gate configuration.

An added benefit for all configurations described is that the potential for a cutting function exists. In some gate valves, a requirement is that hardware such as cables, tooling, etc. left in the open bore of the valve must able to be sheared clear by the gate and still allow the valve to close and seal. In these configurations, the gate and/or seat are typically fitted with some sort of extra-hard and possibly sharp edges on their inner diameters' engaging perimeters. In many cases this blade/edge is ceramic. The proposed configurations require minimal, if any, modification to perform this function since the interfacing surfaces are already made of ceramic or cemented carbide, or equipped with a ceramic or cemented carbide plate or cemented carbide-hardfaced surface.

DETAILED DESCRIPTION OF THE INVENTION

Figure 1:
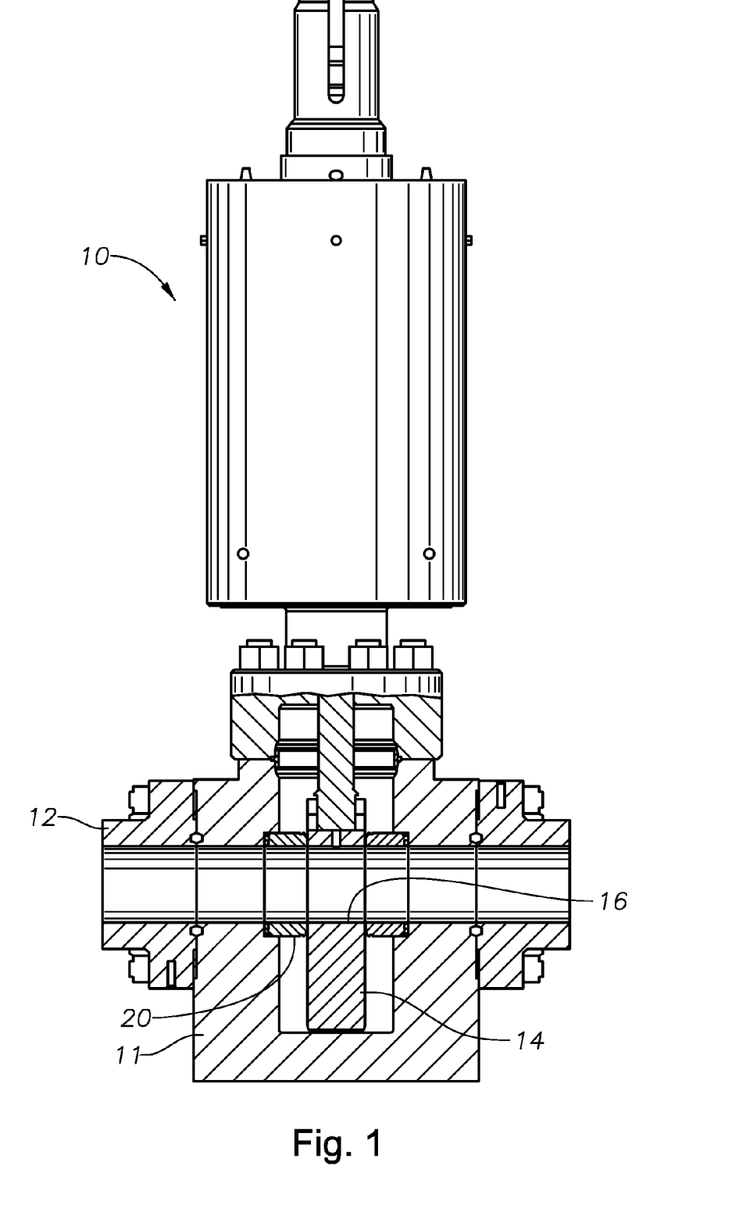
FIG. 1 is a vertical partial sectional view of a gate valve, in accordance with an embodiment of the invention.

Referring to FIG. 1, an example embodiment of a gate valve 10 is shown. The gate valve 10 has a body 11 and a flow passage 12 that extends transversely through body 11. Valve 10 has a gate 14 with an opening 16 therethrough. A gate 14 is shown in the open position with the opening 16 registered with the passage 12. The gate 14 travels within a cavity 18 in the body 11 that is transversal to and intersected by the passage 12. The term "substrate" is used throughout to describe either a plate affixed to an underlying structure, a layer welded onto an underlying structure, or a solid structure, wherein the plate, layer, or solid structure comprises a ceramic and/or hardfacing alloy matrix composite.

Figure 2:
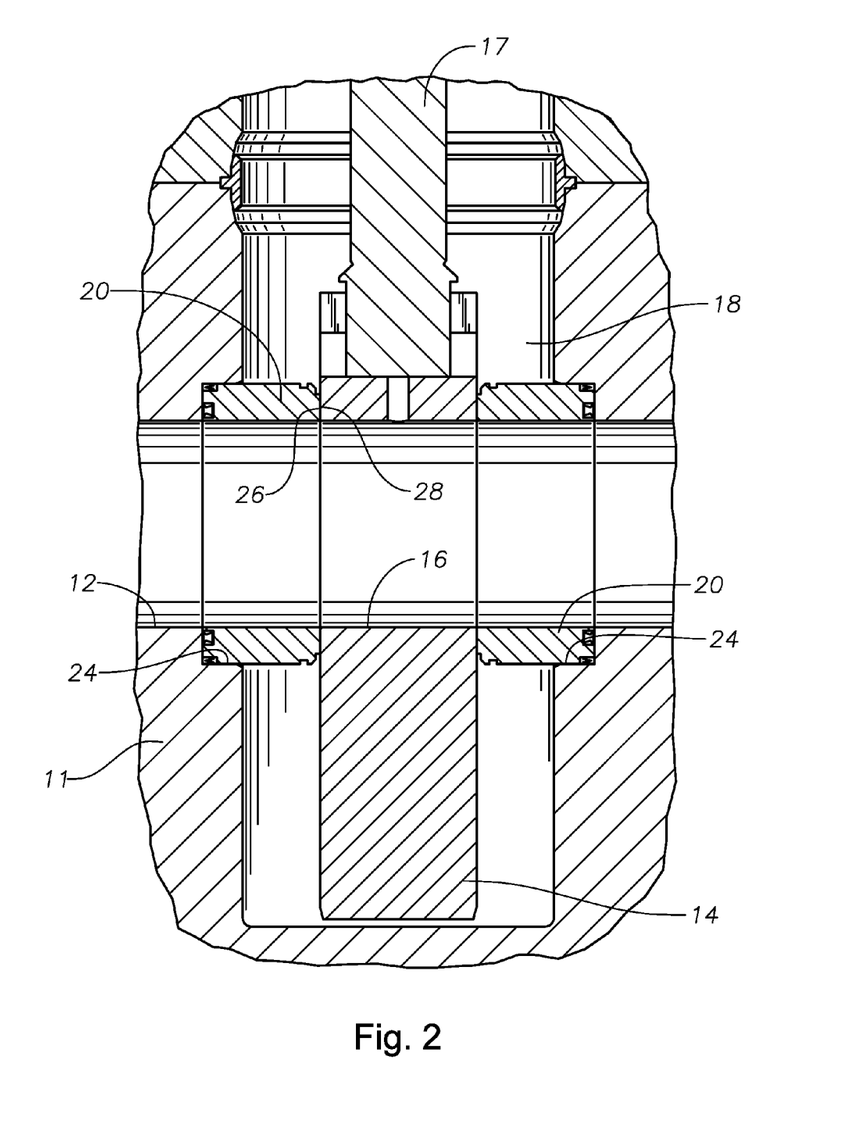
FIG. 2 is a sectional view of a portion of a valve body shown in FIG. 1, in accordance with an embodiment of the invention.
Figure 3:
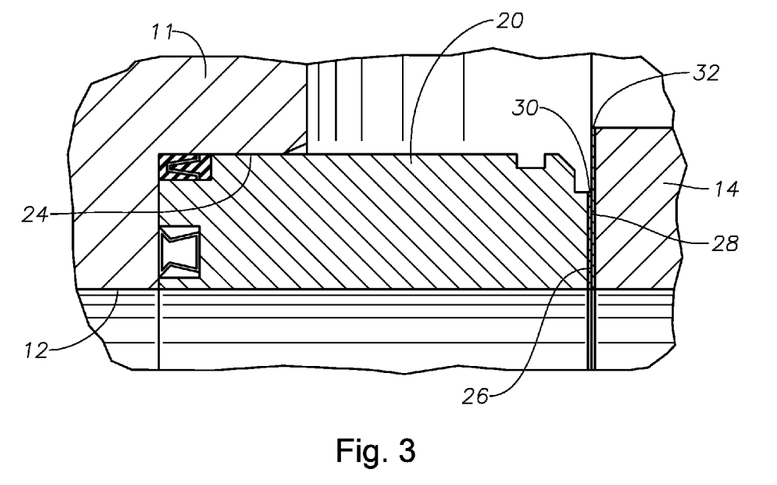
FIG. 3 is an enlarged sectional view of the coated seat and gate shown in FIG. 2, in accordance with an embodiment of the invention.

Referring to FIGS. 2 and 3, enlarged and more detailed illustrations of an example embodiment of the gate valve 10 of FIG. 1 are shown for clarity and to better explain the invention. Ring-shaped valve seats 20 seal against counterbores 24 formed on the body 11. The seats 20 have openings that circumscribe the passage 12 on opposing sides of the gate 14. The gate 14 is in contact with the seats 20 in both the open and closed positions. In this embodiment, the seats 20 and the gate 14 are formed from a ceramic and/or hardfacing alloy matrix composite, such as Tungsten Carbide with a Cobalt or Nickel binder. The hardness of the cemented carbide may vary between Rockwell C 72-73, which is approximately twice as hard as the average 36 Rockwell C of the existing standard Inconel 718 material typically used in fabricating these parts. Further, the modulus of elasticity of the ceramic and/or hardfacing alloy matrix composite may be on the order of 48,000 KSI, making it approximately 65% stiffer than the standard Inconel 718 metal alloy, which has modulus of elasticity of 29,000 KSI. Material properties may be altered with heat treatments. Various compositions of ceramic and/or hardfacing alloy matrix composite compounds may be utilized for the seat 20 and the gate 14, however, one material candidate, which the invention is not limited to, is a 86% WC10% Co4% Cr grade.

In an example of operation, a stem 17 (FIG. 2) connected to the gate 14 moves the gate 14 to the open position and registers the opening 16 of the gate 14 with flow passage 12 of the valve 10, thereby allowing flow through the valve 10. When the gate 14 is closed, the opening 16 no longer registers with the flow passage 12 and thus flow is stopped. The gate 14 has an engaging face 26 on each side that interfaces with a seat face 28 on each of the seats 20. To minimize friction when actuating the gate 14, the interfacing surfaces 26, 28 between the seats 20 and the gate 14 are coated with low-friction coatings 30, 32, such as a Diamond-like Carbon (DLC) coating. The DLC coating 30, 32 may be deposited onto the faces 26, 28 at a lower temperature than the temperature used during the fabrication of the ceramic and/or hardfacing alloy matrix composite parts, the seat 20 and gate 14 in this embodiment. This results in the coatings 26, 28 having a higher quality, lower friction surface than the ceramic and/or hardfacing alloy matrix composite parts themselves.

Continuing to refer to FIGS. 2 and 3, while gate 14 is open, fluid is flowing through the flow path 12. When the gate 14 is closed the pressure increases upstream of the gate 14, resulting in an increase in the bearing stress on the seat 20 and the gate 14. As explained earlier, in existing configurations, the increased bearing stress could cause local deflection of the metallic seats and the gate. However, the significantly harder and stiffer ceramic making up the seats 20 and the gate 14, in this embodiment, help prevent local deflection and associated stress accumulation associated with softer metals.

Figure 4:
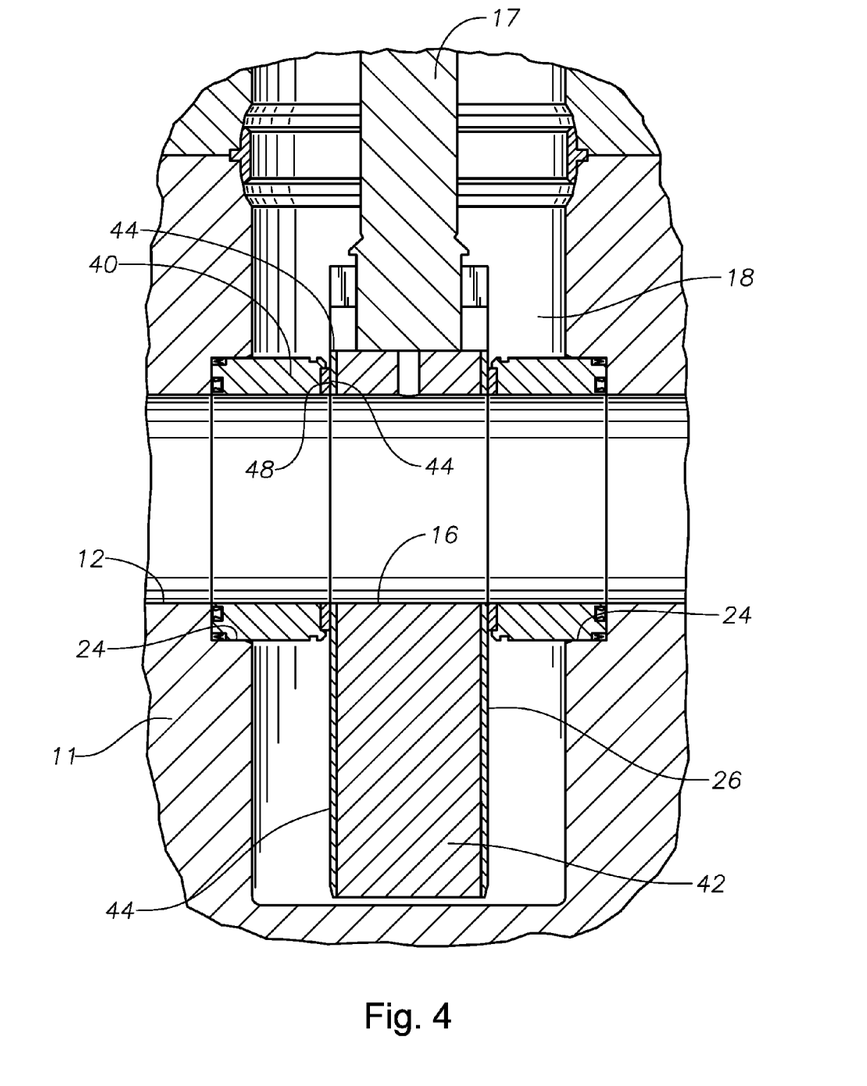
FIG. 4 is a sectional view of an alternative embodiment of the flow path of the valve shown in FIG. 1, in accordance with an embodiment of the invention.
Figure 5:
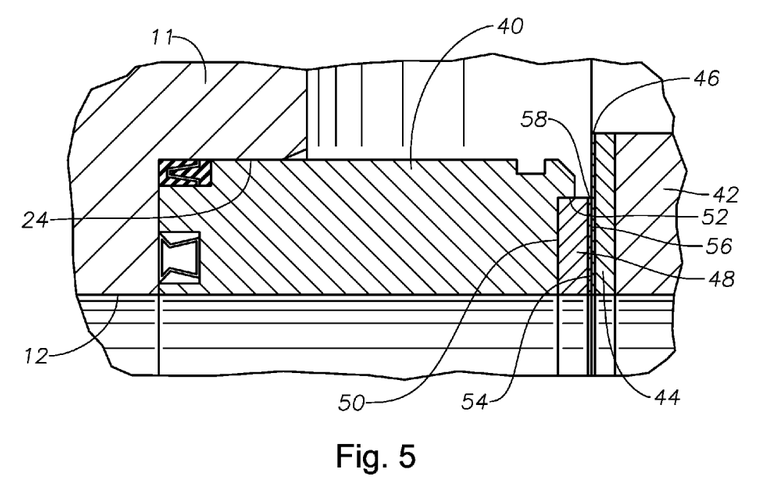
FIG. 5 is an enlarged sectional view of the coated seat ring and gate plate interface shown in FIG. 4, in accordance with an embodiment of the invention.

In another embodiment, illustrated in FIGS. 4 and 5, ring-shaped valve seats 40 seal against a counterbore 24 formed on the body 11. As in the previously described embodiment, the seats 40 have openings that circumscribe the passage 12 on opposing sides of the gate 14. A gate 42 is composed of a metallic material located between two ceramic and metal composite plates 44, whose outer surfaces are coated with a low-friction material coating 46, such as tungsten carbide in a cobalt matrix having a DLC coating. In the embodiment shown, the plate 44 is bonded to the gate 42, for example, through soldering, brazing, or welding. As shown in FIG. 5, seat rings 48 are shown on a side of the seats 40 facing the upstream and downstream side of the gate 14. The plate or substrate 44 of the gate 42 is on both the upstream and downstream sides. The seat ring 48 fits within an annular recess or pocket 50 formed on the seat 40. The outer periphery of the recess 50 is set radially inward from the outer diameter of the seat 40 and forms a rim 52 along the outer periphery of the recess 50. The seat ring 48 may be bonded to the seat 40 or may be allowed to self-seal against the seat 40 and plate 44 on the gate 42. The plates 44 can vary in thickness from 1/8" to 1/2" depending on the pressure environment and has a face 54 that selectively engages an engaging face 56 of the seat ring 48. In an example embodiment, face 27 and face 28 lie in substantially parallel planes that are transverse to the passage 12. The engaging face 54 of the plate 44 is coated with the low-friction coating 46 and the engaging face 56 of the seat ring 48 may also be coated with a low-friction material coating 58. The gate 42 can be thinner than existing gates in order to accommodate the plates 44. Both the seat ring 48 and the plate 44 may be formed from a ceramic and/or hardfacing alloy matrix composite, such as Tungsten Carbide with a Cobalt or Nickel binder. The hardness of the cemented carbide may be approximately Rockwell C 72-73. The seat 40 and gate 42 material can be made from corrosion resistant steel alloys such as one of the following: Inconel (a nickel-chrome alloy); high quality low alloy steel; stainless steel; combinations thereof; or another suitable metal material. Inconel 718, for example, typically has a Rockwell Hardness Number (HRN) in the C scale between 32 and 40. Material properties can be altered by the heat treatment process. Thus, example embodiment of the cemented carbide plate 44 and seat ring 48 can be approximately twice as hard as Inconel 718 material. Further, the modulus of elasticity of the cemented carbide plate 44 and seat ring 48 is approximately 65% stiffer than the standard Inconel 718. As in the first embodiment, various compositions of ceramic and/or hardfacing alloy matrix composites may be utilized for the substrate 44 and seat ring 48.

In an example of operation for this embodiment, the stem 17 moves the gate 42 to the open position and registers the opening 16 of the gate 42 registers with flow passage 12 of the valve 10, thereby allowing flow through the valve 10. When the gate is closed, the opening 16 no longer registers with the flow passage 12 and thus flow is stopped. As previously explained, when the gate 42 is closed the pressure increases upstream of the gate 42, resulting in an increase in the bearing stress on the seat 40 and the gate 42. As explained earlier, in existing configurations, the increased bearing stress could cause local deflection of the seat 40 and the gate 42. However, the significantly harder and stiffer cemented carbide making up the seat rings 48 and the plates 44 on the gate 14 help prevent local deflection, and associated stress accumulation, associated with the softer metal of the seat 40 and gate 42. Prevention of local deflection, along with the low friction coatings 46, 58 on the plates 44 and seat ring 48 results in less energy being required to actuate the valve, potentially eliminating the need for larger actuators.

Figure 6:
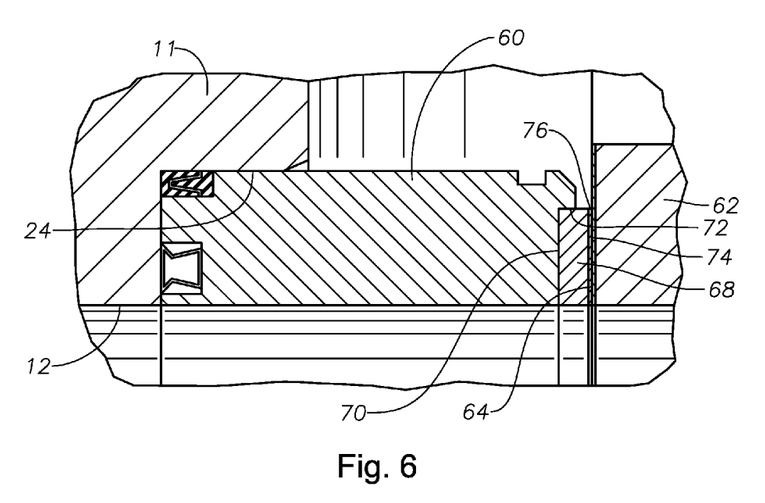
FIG. 6 is an alternative embodiment of a coated seat ring and gate interface, in accordance with an embodiment of the invention.

In another embodiment, illustrated in FIG. 6, a combination of the previously discussed embodiments is shown. Ring-shaped valve seats 60 seal against a counterbore 24 formed on the body 11. As in the previously described embodiment, the seats 60 have openings that circumscribe the passage 12 on opposing sides of the gate 14. A gate 62 is composed of a cemented carbide material such as Tungsten Carbide with a Cobalt or Nickel binder and has an engaging face 64. The engaging face 64 is coated with a low friction material coating 66, such as a DLC coating or other suitable material. A seat ring 68 is located between the seat 60 and the gate 62 on both the upstream and downstream sides. The seat ring 68 fits within an annular recess or pocket 70 formed on the seat 60. The outer periphery of the recess 70 is set radially inward from the outer diameter of the seat 60 and forms a rim 72 along the outer periphery of the recess 70.

The seat ring 68 has an engaging face 74 with a low-friction coating 76 to facilitate sliding between the gate 62 and the seat ring 48. As in previously discussed embodiments, the ceramic and/or hardfacing alloy matrix composite gate 62 and seat ring 68 help prevent local deflection and associated stress accumulation associated with the softer metals. The net bearing stress may thus be increased and ultimately, less energy is required to actuate the valve, potentially eliminating the need for larger actuators.

Figure 7:
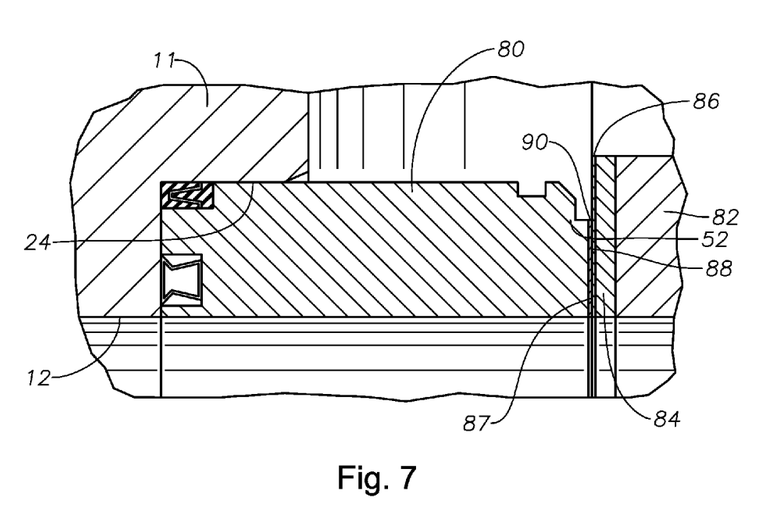
FIG. 7 is an alternative embodiment of a coated seat and gate plate interface, in accordance with an embodiment of the invention.

In yet another embodiment, illustrated in FIG. 7, a combination of the previously discussed embodiments is shown. Ring-shaped valve seats 80 seal against a counterbore 24 formed on the body 11. As in the previously described embodiment, the seats 80 have openings that circumscribe the passage 12 on opposing sides of the gate 14. The seats 80 are fabricated from a ceramic and/or hardfacing alloy matrix composite, such as Tungsten Carbide with a Cobalt or Nickel binder. A gate 82 is composed of a metallic material located between two ceramic and/or hardfacing alloy matrix composite plates 84, whose engaging surfaces 87 are coated with a low-friction material coating 86 or other suitable material. As previously discussed, in an example embodiment shown, the plate 84 is bonded to the gate 82, for example, through soldering, brazing, or welding. The seat 80 has an engaging face 88 that is also coated by a low-friction coating 90 to facilitate sliding between the gate 82 and the seat 80. As in previously discussed embodiments, the ceramic and/or hardfacing alloy matrix composite plate 84 of the gate 82 and seat 80 help prevent local deflection and associated stress accumulation associated with the softer metals. The net bearing stress may thus be increased and ultimately, less energy is required to actuate the valve 10, potentially eliminating the need for larger actuators.

Figure 8:
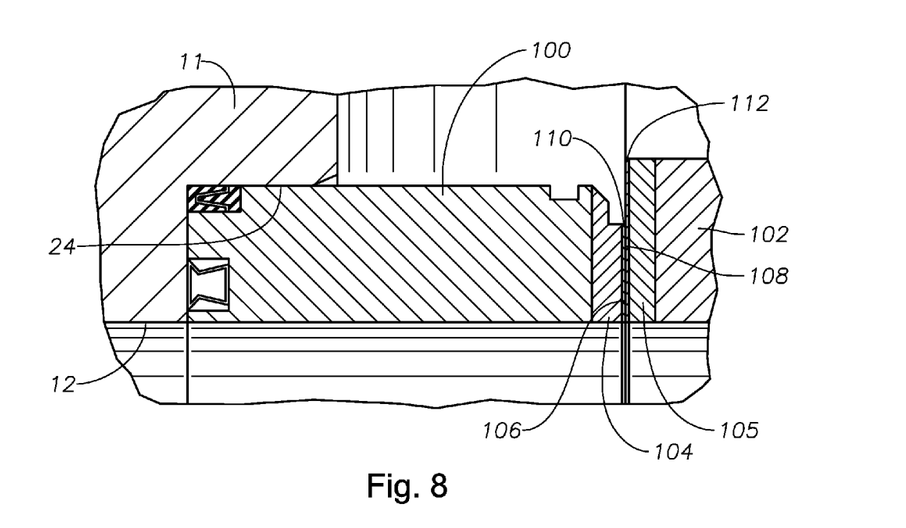
FIG. 8 is an alternative embodiment of a hardfaced and coated seat and gate shown, in accordance with an embodiment of the invention.

In yet another embodiment, illustrated in FIG. 8, a hardfacing alternative is shown. Ring-shaped valve seats 100 seal against a counterbore 24 formed on the body 11. As in the previously described embodiments, the seats 100 have openings that circumscribe the passage 12 on opposing sides of the gate 102. A ceramic and/or hardfacing alloy matrix composite hardfacing layer 104, 105 of about 1/8 inch thickness or less is applied by welding, the ceramic and/or hardfacing alloy matrix composite onto the engaging surfaces 106, 108 of at least one of the two seats 100 (one shown) or the gate 102. Welding the ceramic and/or hardfacing alloy matrix composite onto the engaging surface may produce a series of beads that may be removed by grinding to form a flat surface. However, methods other than welding may be used to produce the hardfacing layer. In this embodiment, the seats 100 are composed of metallic material and a low friction coating 110 is applied to the hardfacing layer 104 applied to the seat 100. The low friction coating may be a WCCoCr coating or other suitable material. An optional DLC coating may also be used together with the WCCoCr coating. A low friction coating 112 is also applied to the hardfacing layers 105 of the gate 102. As with previously described embodiments, the ceramic and/or hardfacing alloy matrix composite hardfacing layers 104, 105 of the seats 100 and the gate 102 helps prevent local deflection and associated stress accumulation associated with the softer metals. The net bearing stress may thus be increased and ultimately, less energy is required to actuate the valve 10, potentially eliminating the need for larger actuators. The hardfacing technique may be utilized in each of the embodiments presented above as an alternative to using a ceramic and/or hardfacing alloy matrix compsite plate to form the substrate to provide a stiffer surface.

The combinations of ceramic and/or hardfacing alloy matrix composite plates, seat rings, hardfacing, metal gate and seats described above provide increased hardness and stiffness to the gate and seat to reduce the possibility of performance degrading local deflection in the gate and seat of a valve. The embodiments described thus result in enhanced bearing stress capacity in gate valves and smaller, less expensive valves and actuators due to decreased energy requirements to actuate the valve.

This written description uses examples to disclose the invention, including the best mode, and also to enable any person skilled in the art to practice the invention, including making and using any devices or systems and performing any incorporated methods. These embodiments are not intended to limit the scope of the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method manufacturing a gate valve having a body with a chamber and a flow passage having an axis and extending through and intersecting the chamber, the method comprising:
   (a) providing a gate and two annular seats, each of the gate and the annular seats being formed of a corrosion resistant steel alloy;
   (b) bonding a ceramic and/or hardfacing alloy matrix composite plate to the bodies of each of the annular seats and/or to opposite sides of the body of the gate;
   (c) applying a tungsten carbide coating to each of the plates;
   (d) locating the annular seats at intersections of the flow passage and the chamber; and
   (e) locating the gate in the cavity so that the gate slidingly engages the seats while being moved between open and closed positions.

2. The method according to claim 1, wherein the ceramic and/or hardfacing alloy matrix composite plates comprise tungsten carbide.

3. The method according to claim 2, wherein the ceramic and/or hardfacing alloy matrix composite plate comprise a cobalt matrix for the tungsten carbide.

4. The method according to claim 1, wherein the ceramic and/or hardfacing alloy matrix plates have a modulus of elasticity of at least 48,000 ksi.

5. The method according to claim 1, wherein the ceramic and/or hardfacing alloy matrix composite plates have a thickness of 1/8 to 1/2 inches.

6. The method according to claim 1, wherein step (b) comprises welding the ceramic and/or hardfacing alloy matrix composite plates onto the bodies of the annular seats and/or to the body of the gate.

7. The method of claim 1, further comprising depositing low-friction coating on each of the tungsten carbide coatings.

8. The method according to claim 7, wherein the low-friction coatings comprise diamond-like carbon coatings.

9. An apparatus for controlling well fluids comprising:
   a gate valve having a body with a cavity;
   a passage through the body and intersecting the cavity and that is for handling a flow of a wellbore fluid;
   a pair of annular seats, each of the annular seats circumscribing the passage and provided where the passage intersects the cavity, each of the annular seats having a body formed of a corrosion resistant steel alloy;
   a tungsten carbide seat plate bonded to the body of each of the annular seats;
   a tungsten carbide coating applied to each of the seat plates;
   a diamond-like carbon coating applied to the tungsten carbide coating on each of the seat plates;
   a gate in the cavity selectively movable in sliding engagement with the gate between an open and a closed position, the gate having a body formed of a corrosion resistant steel alloy;
   a tungsten carbide gate plate bonded to opposite sides of the body of the gate;
   a tungsten carbide coating applied to each of the gate plates; and
   a diamond-like carbon coating applied to the tungsten carbide coating on each of the gate plates.

10. An apparatus for controlling well fluids comprising:
    a gate valve having a body with a cavity;
    a passage through the body and intersecting the cavity and that is for handling a flow of a wellbore fluid;
    a pair of annular seats, each of the annular seats circumscribing the passage and provided where the passage intersects the cavity, each of the annular seats having a body formed of a corrosion resistant steel alloy;
    a ceramic and/or hardfacing alloy matrix composite seat plate bonded to the body of each of the annular seats;
    a tungsten carbide coating applied to each of the seat plates;
    a gate in the cavity selectively movable between an open and a closed position in sliding engagement with the annular seats, the gate having a body formed of a corrosion resistant steel alloy;
    a ceramic and/or hardfacing alloy matrix composite gate plate bonded to opposite sides of the body of the gate; and
    a tungsten carbide coating applied to each of the gate plates.

11. The apparatus according to claim 10, further comprising a low-friction coating deposited atop the tungsten carbide coating on each of the seat plates and each of the gate plates.

12. The apparatus according to claim 11, wherein the low-friction coating comprises a diamond-like carbon.

* * * * *